3,527,650
Patented Sept. 8, 1970

3,527,650
SUTURE COATING OF POLYETHYLENE OR POLYTETRAFLUOROETHYLENE
Edward A. Block, Somerville, N.J., assignor to Ethicon, Inc., a corporation of New Jersey
No Drawing. Filed Dec. 21, 1967, Ser. No. 692,283
Int. Cl. A61l 17/00
U.S. Cl. 117—7
8 Claims

ABSTRACT OF THE DISCLOSURE

The hand and lubricity of a braided polyethylene terephthalate suture are improved by applying to the surface thereof polymers of polyethylene or polytetrafluoroethylene having a lower coefficient of friction than the suture and a styrene-acrylic ester copolymer resin binder therefor.

---

The present invention relates to nonabsorbable surgical sutures and more specifically to braided multifilament sutures of polyethylene terephthalate. Braided polyethylene terephthalate sutures have been used by many in the surgical profession for years and actually are preferred over silk by many surgeons for their strength and lack of tissue reactivity. Other surgeons prefer to use waxed silk when a nonabsorbable suture is required because of its excellent hand, ease of knotting, and ease of passage through tissue.

It is a known disadvantage of polyethylene terephthalate sutures that the knot may slip unless repeated knots are tied. Attempts have been made to improve the knotability of polyethylene terephthalate by modifying the surface thereof to decrease lubricity. One method of doing this is described in U.S. Pat. No. 3,307,971, which issued to Leonard D. Kurtz in March of 1967.

The present invention is directed to increasing the lubricity of a braided polyethylene terephthalate suture by applying a surface coating of a nontoxic and physiological inert resin that has a lower coefficient of friction than the polyethylene terephthalate, such as, polytetrafluoroethylene or polyethylene.

Polytetrafluoroethylene has been applied to braided polyethylene terephthalate sutures for the purpose of filling the interstices of the braided structure and achieving the characteristics of a solid monofilament. U.S. Pat. No. 3,322,125 described in Example I impregnating a braided 4/0 polyethylene terephthalate suture with a suspension of polytetrafluoroethylene particles having a particle size of about 0.2 micron. The suture is dried and stretched at 450° F. whereby the particles of polytetrafluoroethylene are trapped within the body of the suture.

The process described in U.S. Pat. No. 3,322,125, however, does not produce a satisfactory surface coating of polytetrafluoroethylene because the polytetrafluoroethylene particles do not adhere to the surface of the suture material. The particles can flake off and produce foreign body reactions near the suture site. It has now been discovered that polytetrafluoroethylene and other resinous particles having a coefficient of friction lower than that of the braided polyethylene terephthalate surface may be cemented to the surface of the braided polyethylene terephthalate suture with a binder resin which prevents flaking of the resinous particles.

Binder resins that are suitable for use in securing polytetrafluoroethylene and similar resinous particles having a lower coefficient of friction than polyethylene terephthalate to the surface of a braided polyethylene terephthalate suture are the non-ionic, self-cross linking, or cross-linkable acrylic polymers, such as Rhoplex HA-12 and Rhoplex B-15, manufactured by Rohm and Haas Company, Philadelphia, Pa., and thermoplastic acrylic polymers, such as Hycar 2601, manufactured by B. F. Goodrich Chemical Company of Cleveland, Ohio and copolymers of an acrylic ester and styrene, such as Aerotex Resin 134, manufactured by the American Cyanamid Company, Bound Brook, N.J.

In the practice of the present invention, a braided polyethylene terephthalate suture is passed through an aqueous mixed dispersion of an acrylic latex of the type identified above and polytetrafluoroethylene particles or polyethylene particles. The ratio of acrylic latex to polytetrafluoroethylene particles in the dispersion is about 1:3 but may be increased to improve the adhesion of the lubricating particles to the surface of the suture or decreased to increase the lubricity of the surface coating. The dwell time of the braided suture with the polytetrafluoroethylene dispersion is just sufficient to coat the surface as penetration of the lubricant particles into the interstices of the suture is not necessary or desired. The braided polyethylene terephthalate after it leaves the coating bath is dried and heat cured. The structure of the braided polyethylene terephthalate suture is altered by the shrinkage that occurs during the curing process. To restore the original close braided structure and control the size (diameter), the coated, braided suture after cooling is heated and stretched under tension. The coated, braided strand may be conveniently heated by moving it one or more times past a steel plate maintained at a temperature between 350° F. and about 440° F. at the rate of 50 to 100 yards per minute. The smaller size sutures, e.g., size 6/0, may be stretched in this manner about 25 percent to 40 percent. The larger sutures, e.g., size 2, are stretched as as much as 40 percent to 60 percent.

It is an important aspect of the present invention that the binder resin is flexible and bound to the braided suture in such a manner that it does not crack, flake, or come off of the suture during the heat-stretching step.

The product so obtained has an improved hand and surface lubricity. Yet the knot will not slip if a double square knot is tied. The surface lubricity of a coated polyethylene terephthalate suture may be demonstrated by the following test:

To the cross bar of an Insthon tester is secured a 3½" pulley and a 2" pulley. Using a B cell and the associated upper jaw (red), the instrument is calibrated with a 100 gram weight on the B cell clamp to full scale deflection on the ×1 scale.

To determine the surface lubricity of a coated strand, a 45" length of suture is clamped in the center of the upper jaw; the free end is passed counterclockwise around the 3½" diameter pulley; and a counterclockwise single throw is made approximately 1½" above the face of the 3½" diameter pulley wheel. The free end of the suture is then passed over the 2" diameter pulley wheel and secured to a 50 gram weight. The distance from the periphery of the pulley face to the bottom of the B cell clamp is 2½".

In operation, the ×10 scale on the Instron tester is used (1,000 grams full scale) and the crosshead speed and chart speed are 20" per minute.

As the suture passes over itself, a curve is plotted on the graph paper. Since a braided suture has braid protrusions and is somewhat elliptical in cross-section, a smooth curve does not appear. The "stick" portion of a stick-slip curve is produced when it is easier for the suture to stick to itself and elongate than to slip. As the suture is elongated more and more, the tension continues to build up until either the yield point of the suture is reached or until the cohesive force is overcome and the suture slips. This cycle is repeated producing a saw-tooth pattern on the chart.

The surface lubricity of the braided suture may be determined from the maximum and minimum friction peaks on the graph in accordance with the following equation:

average lubricity = minimum peak
$$+ \frac{(\text{maximum peak} - \text{minimum peak})}{2}$$

The lubricity of the surface as determined by the test described above may be confirmed subjectivly (by feel).

Microscopic examination of the surface coated braided sutures confirms that the surface coating does not scuff or flake off on tie-down.

The invention will be understood from the following examples which illustrate preferred embodiments of the inventive idea.

EXAMPLE I

A braided skein of polyethylene terephthalate (Dacron) multifilament, size 2/0 [1], passed beneath two nylon rollers immersed in a trough containing a polytetrafluoroethylene resin dispersed in a thermosetting acrylic latex (Emralon 312, manufactured by Achesin Collids Company, Port Huron, Mich.). The polytetrafluoroethylene resin constitutes about 50 percent of the total resin solids. The braided multifilament moves through the trough at the rate of about 16 yards per minute, the surface of the skein being in contact with the liquid dispersion for about 0.6 to 0.9 seconds. The concentration of resin solids in the trough was maintained at 50±5 percent throughout the run.

After coating, the skein is heated in an over for ½ hour at 300° F. and heat stretched 40 percent by passing the moving skein 12 times under tension in close proximity to an 18-inch plate heated to 440° F.

The product so obtained has utility as a suture. It has an excellent hand and a smooth, resinous surface coating amounting to 3 percent of the total suture weight.

The surface lubricity, as measured by the Instron surface lubricity test described above, is 500 grams. The coated suture does not slip when tied with a double square knot.

EXAMPLE II

A braided skein of polyethylene terephthalate (Dacron) multifilament, size 2/0, is coated by passing it though one foot in length that contains a resinous dispersion having the following composition:

| | Parts |
|---|---|
| Acrylic resin 45 percent solids (Rhoplex HA-12) | 707 |
| Polytetrafluoroethylene resin 60 percent solids (Teflon 30 manufactured by E. I du Pont de Nemours and Company, Inc., Wilmington, Del.) | 1,588 |
| Water | 7,705 |

The skein moves through the trough at a speed of 20 feet per minute and is heated in an oven for ½ hour at 300° F. and heat stretched 35 percent by passing the moving skein 12 times under tension in close proximity to an 18-inch plate heated to 440° F.

The product so obtained has utility as a suture. It has an excellent hand and a smooth, resinous surface coating amounting to 3.8 percent of the total suture weight. The surface lubricity, as measured by the Instron surface lubricity test described above, is 550 grams. The coated suture does not slip when tied with a double square knot.

EXAMPLE III

A braided skein of polyethylene terephthalate (Dacron) multifilament, size 2/0, is passed beneath two nylon rollers immersed in a trough containing 340 parts of a polytetrafluoroethylene resin containing 60 percent resin solids and 151 parts of a thermosetting acrylic latex (45 percent solids). The acrylic latex is an interpolymer of 90 parts of 2-ethylhexyl acrylate, 12 parts glycidyl acrylate, 90 parts styrene, and 8 parts methacrylic acid. The braided multifilament moves through the trough at the rate of about 16 yards per minute, the surface of the skein being in contact with the liquid dispersion for about 0.6 to 0.9 second.

After coating, the skein was heated in an oven for ½ hour at 275° F. and heat stretched 45 percent by passing the moving skein 12 times under tension in close proximity to an 18-inch plate heated to 440° F.

The product so obtained has utility as a suture. It has an excellent hand and a smooth, resinous surface coating amounting to 2.6 percent of the total suture weight.

The surface lubricity, as measured by the Instron surface lubricity test described above, is 530 grams. The coated suture does not slip when tied with a double square knot.

EXAMPLE IV

A braided skein of polyethylene terephthalate (Dacron) multifilament, size 2/0, is coated by passing it through a trough one foot in length that contains a resinous dispersion having the following composition:

| | Parts |
|---|---|
| Acrylic resin 46 percent solids (Rhoplex B-15) | 832 |
| Polytetrafluoroethylene resin 60 percent solids (Teflon 30) | 1,868 |
| Water | 7,300 |

The skein moves through the trough at a speed of 20 feet per minute and is heated in an oven for ½ hour at 300° F. and heat stretched 50 percent by passing the moving skein 12 times under tension in close proximity to an 18-inch plate heated to 440° F.

The product so obtained has utility as a suture. It has an excellent hand and a smooth, resinous surface coating. The surface lubricity, as measured by the Instron surface lubricity test described above, is 490 grams. The coated suture does not slip when tied with a double square knot.

EXAMPLE V

A braided skein of polyethylene terephthalate (Dacron) multifilament, size 2/0, is passed beneath two nylon rollers immersed in a trough containing 1,494 parts of a tetraffuoroethylene resin containing 60 percent resin solids (Teflon 30); 1,192 parts of a styrene acrylate copolymer resin latex (Aerotex Resin 134); and 7,314 parts of water. The braided multifilament moves through the trough at the rate of about 20 feet per minute.

After coating, the skein was heated in an oven for ½ hour at 300° F. and heat stretched 55 percent by passing the moving skein 12 times under tension in close proximity to an 18-inch plate heated to 440° F.

The product so obtained has utility as a suture. It has an excellent hand and a smooth, resinous surface coating amounting to 3.94 percent of the total suture weight.

The surface lubricity, as measured by the Instron surface lubricity test described above, is 466 grams. The coated suture does not slip when tied with a double square knot.

EXAMPLE VI

A braided skein of polyethylene terephthalate (Dacron) multifilament, size 2/0, is coated by passing it through a trough one foot in length that contains a resinous dispersion having the following composition:

| | Parts |
|---|---|
| Polyethylene resin 50 percent solids Valsof K070 manufactured by Valchem Chemical Division of United Merchants and Manufacturers, Inc., New York, N.Y. | 126 |
| Acrylic resin (45 percent solids) (Rhoplex HA-12) | 126 |
| Water | 748 |

---
[1] Diameter 10-13 mils as determined by the method described at p. 918 of the U.S. Pharmacopeia, vol. XVII.

The skein moves through the trough at a speed of 20 feet per minute and is heated in an oven for ½ hour at 300° F. and heat stretched 40 percent by passing the moving skein 12 times under tension in close proximity to an 18-inch plate heated to 440° F.

The product so obtained has utility as a suture. It has an excellent hand and a smooth, resinous surface coating amounting to 3.3 percent of the total suture weight. The dry straight tensile strength is 9.1 pounds, and the dry knot strength is 6.4 pounds. The coated suture does not slip when tied with a double square knot.

EXAMPLE VII

A braided skein of polyethylene terephthalate (Dacron) multifilament, size 2/0, is coated by passing it through a trough one foot in length that contains a resinous dispersion having the following composition:

| | Parts |
|---|---|
| Polyethylene resin 30 percent solids Valspex N-123 manufactured by the Valchem Division of United Merchants and Manufacturers, Inc., New York, N.Y. | 3,375 |
| Non-crosslinking acrylic resin (Hycar 2601) | 675 |
| Water | 5,950 |

The skein moves through the trough at a speed of 20 feet per minute and is heated in an oven for ½ hour at 300° F. and heat stretched 45 percent by passing the moving skein 12 times under tension in close proximity to an 18-inch plate heated to 440° F.

The product so obtained has utility as a suture. It has an excellent hand and a smooth, resinous surface coating amounting to 3.5 percent of the total suture weight.

EXAMPLE VIII

A braided skein of polyethylene terephthalate (Dacron) multifilament, size 2/0, is coated by passing it through a trough one foot in length that contains a resinous dispersion having the following composition:

| | Parts |
|---|---|
| Acrylic resin 50 percent solids (Hycar 2601) | 720 |
| Polytetrafluoroethylene resin 60 percent solids (Teflon 30) | 1,868 |
| Water | 7,412 |

The skein moves through the trough at a speed of 20 feet per minute and is heated in an oven for ½ hour at 300° F. and heat stretched 40 percent by passing the moving skein 12 times under tension in close proximity to an 18-inch plate heated to 440° F.

The product so obtained has utility as a suture. It has an excellent hand and a smooth, resinous surface coating. The surface lubricity, as measured by the Instron surface lubricity test described above, is 553 grams. The coated suture does not slip when tied with a double square knot.

The invention described and illustrated herein before and secured by this Letters Patent is defined in the following patent claims.

What is claimed is:

1. A braided polyethylene terephthalate suture having a surface coating of a first resin selected from the group consisting of tetrafluoroethylene and polyethylene and a second binder resin comprising a styrene-acrylic ester copolymer, the weight ratio of said first resin to said second resin being between about 1:1 and about 3:1.

2. The suture of claim 1, wherein said first resin is polytetrafluoroethylene.

3. The suture of claim 1 wherein said acrylic ester copolymer is a copolymer of 2-ethylhexyl acrylate.

4. The suture of claim 1, wherein said first resin is polyethylene.

5. A method of improving the hand and surface lubricity of a braided polyethylene terephthalate suture comprising the steps of immersing the suture in an aqueous dispersion of a first resin selected from the group consisting of tetrafluoroethylene and polyethylene and a second binder resin comprising a styrene-acrylic ester copolymer, the weight ratio of said first resin to said second resin being between about 1:1 and about 3:1, for a time sufficient to wet the surface of said suture but not sufficient for said resins to substantially penetrate into the interstices of said suture, drying the suture, curing the binder resin, and heating and stretching the suture at an elevated temperature, whereby a resinous coating is formed on the surface of the suture.

6. The method of claim 5, wherein said first resin is polytetrafluoroethylene.

7. The method of claim 5, wherein said suture is heated at about 300° F. for about one-half hour.

8. The method of claim 5, wherein said first resin is polyethylene.

References Cited

UNITED STATES PATENTS

| 3,264,136 | 8/1966 | Hedge | 117—7 X |
| 3,322,125 | 5/1967 | Kurtz | 117—138.8 X |
| 3,379,552 | 4/1968 | Kurtz | 117—138.8 X |
| 3,390,681 | 7/1968 | Kurtz | 128—335.5 |

ALFRED L. LEAVITT, Primary Examiner

A. GRIMALDI, Assistant Examiner

U.S. Cl. X.R.

117—138.8, 139.5, 161; 128—335.5